(12) United States Patent
Johannesson et al.

(10) Patent No.: US 11,999,502 B2
(45) Date of Patent: Jun. 4, 2024

(54) AERIAL VEHICLE ARCHITECTURES FOR IMPROVED THRUST EFFICIENCY AND INTERNAL COOLING

(71) Applicant: FLIR Unmanned Aerial Systems ULC, Vancouver (CA)

(72) Inventors: Glen Johannesson, Waterloo (CA); Albert Pegg, New Dundee (CA); Dmytro Silin, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 336 days.

(21) Appl. No.: 17/239,514

(22) Filed: Apr. 23, 2021

(65) Prior Publication Data
US 2022/0009647 A1    Jan. 13, 2022

Related U.S. Application Data

(60) Provisional application No. 63/019,185, filed on May 1, 2020.

(51) Int. Cl.
| | |
|---|---|
| *B64D 33/08* | (2006.01) |
| *B64C 27/08* | (2023.01) |
| *B64C 27/20* | (2023.01) |
| *B64C 39/02* | (2023.01) |
| *B64U 10/13* | (2023.01) |
| *B64U 30/20* | (2023.01) |
| *B64U 50/14* | (2023.01) |

(52) U.S. Cl.
CPC .............. *B64D 33/08* (2013.01); *B64C 27/08* (2013.01); *B64C 27/20* (2013.01); *B64C 39/024* (2013.01); *B64U 10/13* (2023.01); *B64U 30/20* (2023.01); *B64U 50/14* (2023.01)

(58) Field of Classification Search
CPC ....... B64C 27/20; B64C 27/08; B64C 39/024; B64U 10/13; B64U 30/20; B64U 50/14
See application file for complete search history.

(56) References Cited

U.S. PATENT DOCUMENTS

| | | | |
|---|---|---|---|
| 8,123,460 B2 | 2/2012 | Collette | |
| 9,376,953 B2 | 6/2016 | Hall | |
| 9,661,789 B2 | 5/2017 | Creviston et al. | |
| 2012/0131904 A1 | 5/2012 | Violett | |

(Continued)

*Primary Examiner* — Michael H Wang
(74) *Attorney, Agent, or Firm* — Haynes and Boone, LLP

(57) ABSTRACT

An airframe assembly for an unmanned aerial vehicle (UAV) is provided where the airframe assembly includes a top airframe assembly, a bottom airframe assembly, and a planar support frame disposed between the top and bottom airframe assemblies. The top and bottom airframe assemblies may form one or more rotor ducts disposed about one or more UAV propulsion motor mounts, respectively, where the rotor ducts are configured to protect rotating rotors disposed therein from physical damage caused by impact with environmental flight hazards. The airframe assembly may further include a heat sink thermally coupled to electronics of the UAV and disposed within the airframe assembly such that rotating blades in the rotor ducts cause air to be drawn from outside of inlet orifices of the top airframe assembly, through an airflow channel in which dissipation surfaces of the heat sink are disposed, and into a rotor duct via an airflow outlet.

18 Claims, 10 Drawing Sheets

(56) References Cited

U.S. PATENT DOCUMENTS

| | | | |
|---|---|---|---|
| 2014/0231582 A1* | 8/2014 | Headrick | B64C 39/024 |
| | | | 244/54 |
| 2016/0152345 A1 | 6/2016 | Molnar et al. | |
| 2016/0200415 A1* | 7/2016 | Cooper | B64C 39/024 |
| | | | 244/17.15 |
| 2017/0001721 A1* | 1/2017 | Saika | B64C 39/024 |
| | | | 244/17.15 |
| 2018/0170553 A1 | 6/2018 | Wang et al. | |
| 2018/0368290 A1* | 12/2018 | Rosales | B64C 39/024 |
| 2019/0047697 A1 | 2/2019 | Kulkarni et al. | |
| 2019/0135419 A1* | 5/2019 | Fisher | B64C 11/205 |
| 2020/0164962 A1* | 5/2020 | Rowe | B64C 11/001 |
| 2020/0255145 A1* | 8/2020 | Goddard | B64C 39/024 |
| 2021/0016875 A1* | 1/2021 | Grabowski | B64C 27/20 |

\* cited by examiner

800

Overmold top airframe shell with top airframe core to provide over-molded top airframe assembly — 802

Overmold bottom airframe shell with bottom airframe core to provide over-molded bottom airframe assembly — 804

Attach top airframe assembly to bottom airframe assembly with support frame partially enclosed between top airframe assembly and bottom airframe assembly — 806

Fig. 8

AERIAL VEHICLE ARCHITECTURES FOR IMPROVED THRUST EFFICIENCY AND INTERNAL COOLING

CROSS-REFERENCE TO RELATED APPLICATIONS

This application claims the benefit of and priority to U.S. Provisional Patent Application No. 63/019,185 filed May 1, 2020 and entitled "AERIAL VEHICLE ARCHITECTURES FOR IMPROVED THRUST EFFICIENCY AND INTERNAL COOLING," which is incorporated herein by reference in its entirety.

TECHNICAL FIELD

The present invention relates generally to unmanned sensor platforms and, more particularly, to devices, systems, and methods for improving thrust efficiency and internal cooling of unmanned aerial vehicles.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. In particular, UAVs have a wide range of real-world applications including surveillance, reconnaissance, exploration, item transportation, disaster relief, aerial photography, large-scale agriculture monitoring, etc. A UAV may generally be equipped with various devices such as sensors and navigation technologies to complete a broad variety of operations. The various devices may add overall weight to the UAV, require protection, and require proper cooling to operate. Thus, there is a need in the art for improved UAV architectures that provide improved thrust efficiency, overall mass reduction or minimization, protection during flight operation, and internal hardware cooling.

SUMMARY

UAV architecture systems and related techniques are provided to improve the operation of unmanned mobile sensor or survey platforms such as UAVs. One or more embodiments of the described UAV architecture systems may advantageously include an airframe assembly. The airframe assembly may include a top airframe assembly that includes a top airframe core at least partially enclosed within a relatively rigid top airframe shell. The top airframe shell and the top airframe core may be a foam-polycarbonate composite UAV component where the top airframe shell is a vacuum formed polycarbonate shell overmolded with expanded polystyrene foam that forms the top airframe core. The airframe assembly may include a bottom airframe assembly that includes a bottom airframe core at least partially enclosed within a relatively rigid bottom airframe shell. The bottom airframe shell and the bottom airframe core may be a foam-polycarbonate composite UAV component where the bottom airframe shell is a vacuum formed polycarbonate shell overmolded with expanded polystyrene foam that forms the bottom airframe core.

The airframe assembly may include a substantially polygonal support frame disposed between the top and bottom airframe cores and configured to physically couple the top airframe core to the bottom airframe core, and consequently the top airframe assembly to the bottom airframe assembly. The support frame may include one or more UAV propulsion motor mounts each configured to provide a mechanical linkage between the airframe assembly and a corresponding UAV propulsion motor.

The top and bottom airframe assemblies may be assembled to form one or more rotor ducts disposed about corresponding UAV propulsion motor mounts. The rotor ducts may be configured to protect rotating rotors disposed therein from physical damage caused by impact with environmental flight hazards and each may comprise an inlet and diffusor outlet shaped to increase thrust efficiency of a propulsion system for the UAV. For example, an overall thrust gain of greater than one may be provided by a density of the top and bottom airframe assemblies and a shape of the rotor ducts when normalized to a combined weight of the top and bottom airframe assemblies. Accordingly, any weight added to the UAV by the rotor ducts may be negated by an overall thrust gain provided by the rotor ducts.

One or more airflow channels may be defined by the top airframe core and the top airframe shell such that the airflow channel forms an air conduit between a plurality of cooling air inlet orifices and a negative pressure generated by a rotor rotating in a rotor duct corresponding to the airflow channel. As the rotor rotates within the rotor duct and causes the negative pressure to form above a horizontal rotor plane, ambient air may be drawn from the plurality of cooling air inlet orifices to a metal heat sink assembly disposed within the air channel, into a corresponding rotor duct, and out through a diffusor outlet of the rotor duct. As such, power electronics and other internal hardware thermally coupled to the metal heat sink assembly may be cooled to a suitable operating temperature to achieve a desired performance.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8 illustrates a flow diagram of a process for assembling an airframe assembly for a UAV in accordance with an embodiment of the disclosure.

Figure 1:
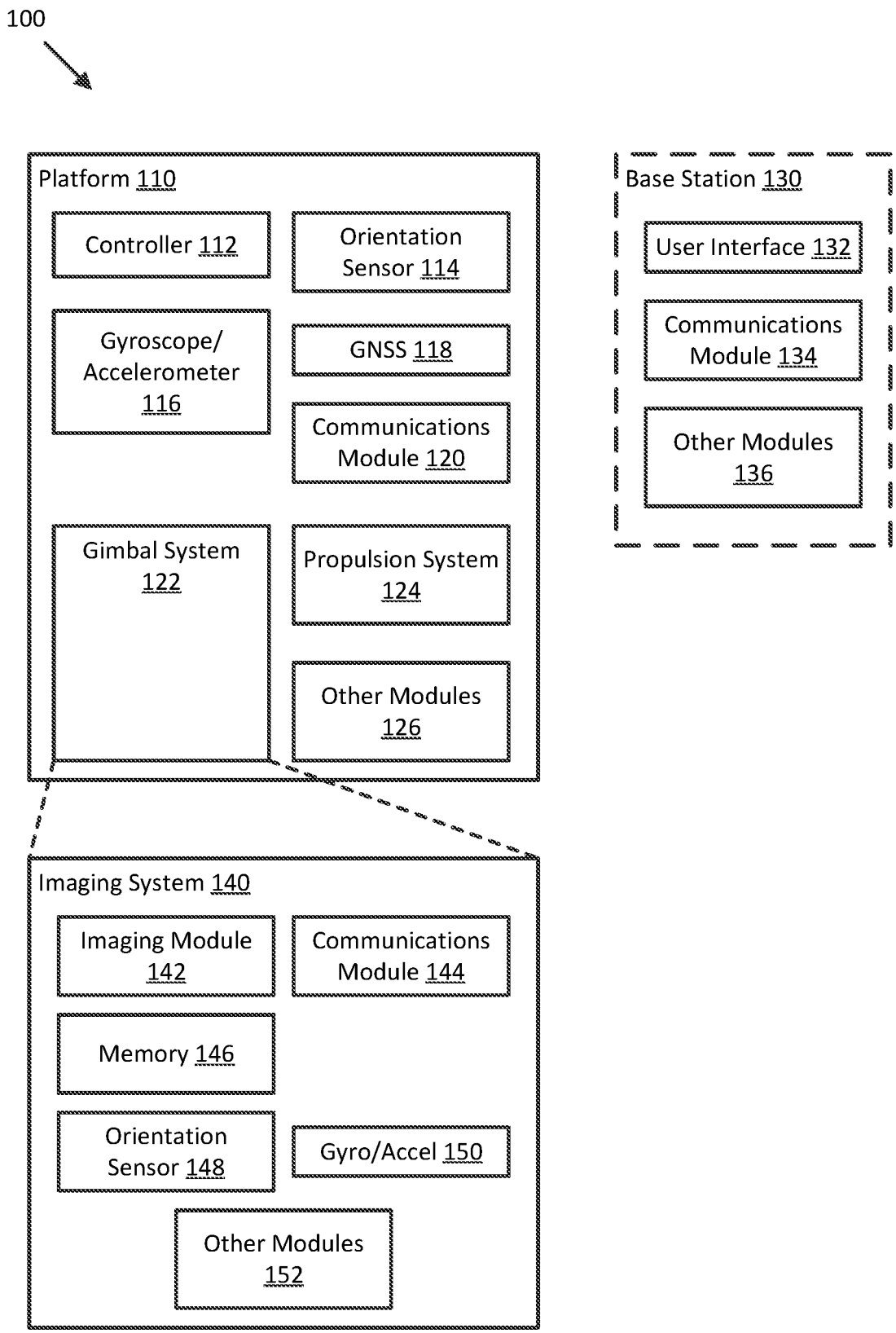
FIG. 1 illustrates a block diagram of a survey system in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Modern unmanned sensor platforms, such as unmanned aerial vehicles (UAVs), are able to operate over long distances and in a variety of environments. The present disclosure provides systems and methods related to a UAV architecture that lends itself to aircraft safety and durability in traversing constrained areas of such environments while also providing improved propulsion efficiency for the UAV. The UAV architecture further allows for upside-down landing and take-off for the UAV, and the UAV architecture may be sufficiently buoyant to allow for the UAV to float on a water surface. For example, while the UAV is floating on a water surface, rotors disposed within the rotor ducts of the UAV architecture may be positioned to be substantially above the water surface to allow for a relatively dry rotor take-off from a floating state. In other embodiments, the UAV architecture may be sufficiently buoyant to allow for the UAV to float though the rotors may be partially or completely submerged. In such cases, the UAV may be configured to operate the rotors under water to provide sufficient thrust to escape from the water surface and lift the UAV into the air.

According to various embodiments, an airframe assembly for a UAV includes a top airframe assembly that includes a top airframe core at least partially enclosed within a relatively rigid top airframe shell. The top airframe shell and the top airframe core may be a foam-polycarbonate composite UAV component where the top airframe shell may be a vacuum formed polycarbonate shell overmolded with expanded polystyrene foam that forms the top airframe core.

The airframe assembly may further include a bottom airframe assembly that includes a bottom airframe core at least partially enclosed within a relatively rigid bottom airframe shell, according to various embodiments. The bottom airframe shell and the bottom airframe core may be a foam-polycarbonate composite UAV component where the bottom airframe shell may be a vacuum formed polycarbonate shell overmolded with expanded polystyrene foam that forms the bottom airframe core.

In various embodiments, the airframe assembly may further include a substantially polygonal support frame disposed between the top and bottom airframe cores and configured to physically couple the top airframe core to the bottom airframe core. The support frame may have one or more UAV propulsion motor mounts each configured to provide a mechanical linkage between the airframe assembly and a corresponding UAV propulsion motor.

In some embodiments, the top and bottom airframe assemblies may be assembled to form one or more rotor ducts disposed about the one or more UAV propulsion motor mounts of the support frame. The rotor ducts may be configured to protect rotating rotors disposed therein from physical damage caused by impact with environmental flight hazards. Each rotor duct may comprise an inlet and diffusor outlet shaped to increase thrust efficiency of a propulsion system for the UAV. For example, an overall thrust gain of greater than one may be provided by a density of the top and bottom airframe assemblies and a shape of the rotor ducts when normalized to a combined weight of the top and bottom airframe assemblies. In other words, a weight added to the UAV by the rotor ducts may be offset/outweighed by the thrust gain provided by the rotor ducts.

FIG. 1 illustrates a block diagram of a survey system 100 including a mobile platform 110, in accordance with an embodiment of the disclosure. In various embodiments, system 100 and/or elements of system 100 may be configured to fly over a scene or survey area, to fly through a structure, or to approach a target and image or sense the scene, structure, or target, or portions thereof, using gimbal system 122 to aim imaging system/sensor payload 140 at the scene, structure, or target, or portions thereof, for example. Resulting imagery and/or other sensor data may be processed (e.g., by sensor payload 140, mobile platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of mobile platform 110 and/or sensor payload 140, as described herein, such as controlling gimbal system 122 to aim sensor payload 140 towards a particular direction, or controlling propulsion system 124 to move mobile platform 110 to a desired position in a scene or structure or relative to a target.

In the embodiment shown in FIG. 1, survey system 100 includes mobile platform 110, optional base station 130, and at least one imaging system/sensor payload 140. Mobile platform 110 may be implemented as a mobile platform configured to move or fly and position and/or aim sensor payload 140 (e.g., relative to a designated or detected target). As shown in FIG. 1, mobile platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of mobile platform 110 may be substantially autonomous and/or partially or completely controlled by optional base station 130, which may include one or more of a user interface 132, a communications module 134, and other modules 136. In other embodiments, mobile platform 110 may include one or more of the elements of base station 130, such as with various types of manned aircraft, terrestrial vehicles, and/or surface or subsurface watercraft. Sensor payload 140 may be physically coupled to mobile platform 110 and be configured to capture sensor data (e.g., visible spectrum images, infrared images, narrow aperture radar data, and/or other sensor data) of a target position, area, and/or object(s) as selected and/or framed by operation of mobile platform 110 and/or base station 130. In some embodiments, one or more of the elements of system 100 may be implemented in a combined housing or structure that can be coupled to or within mobile platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile platform 110 and/or other elements of system 100, such as the gimbal system 122, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various elements of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of mobile platform 110, for example, or distributed as multiple logic devices within mobile platform 110, base station 130, and/or sensor payload 140.

In some embodiments, controller 112 may be configured to substantially continuously monitor and/or store the status of and/or sensor data provided by one or more elements of mobile platform 110, sensor payload 140, and/or base station 130, such as the position and/or orientation of mobile platform 110, sensor payload 140, and/or base station 130, for example. In various embodiments, sensor data may be monitored and/or stored by controller 112 and/or processed or transmitted between elements of system 100 substantially continuously throughout operation of system 100, where such data includes various types of sensor data, control parameters, and/or other data, as described herein.

Orientation sensor 114 may be implemented as one or more of a compass, float, accelerometer, and/or other device capable of measuring an orientation of mobile platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile platform 110 and/or other elements of system 100 and providing such measurements as sensor signals and/or data that may be communicated to other devices of system 100 (e.g., user interface 132, controller 112). GNSS 118 may be implemented according to any global navigation satellite system, including a GPS, GLONASS, and/or Galileo based receiver and/or other device capable of determining absolute and/or relative position of mobile platform 110 (e.g., or an element of mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In some embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication module 120 may be configured to transmit data between elements of system 100 substantially continuously throughout operation of system 100, where such data includes various types of sensor data, control parameters, and/or other data, as described herein.

Gimbal system 122 may be implemented as an actuated gimbal mount, for example, that may be controlled by controller 112 to stabilize sensor payload 140 relative to a target or to aim sensor payload 140 or components coupled thereto according to a desired direction and/or relative orientation or position. As such, gimbal system 122 may be configured to provide a relative orientation of sensor payload 140 (e.g., relative to an orientation of mobile platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously.

In some embodiments, gimbal system 122 may be adapted to rotate sensor payload 140+−90 degrees, or up to 360 degrees, in a vertical plane relative to an orientation and/or position of mobile platform 110. In further embodiments, gimbal system 122 may rotate sensor payload 140 to be parallel to a longitudinal axis or a lateral axis of mobile platform 110 as mobile platform 110 yaws, which may provide 360 degree ranging and/or imaging in a horizontal plane relative to mobile platform 110. In various embodiments, controller 112 may be configured to monitor an orientation of gimbal system 122 and/or sensor payload 140 relative to mobile platform 110, for example, or an absolute or relative orientation of an element of sensor payload 140. Such orientation data may be transmitted to other elements of system 100 for monitoring, storage, or further processing, as described herein.

Propulsion system 124 may be implemented as one or more propellers, rotors, turbines, or other thrust-based propulsion systems, and/or other types of propulsion systems that can be used to provide motive force and/or lift to mobile platform 110 and/or to steer mobile platform 110. In some embodiments, propulsion system 124 may include multiple propellers (e.g., a tri, quad, hex, oct, or other type "copter") that can be controlled (e.g., by controller 112) to provide lift and motion for mobile platform 110 and to provide an orientation for mobile platform 110. In other embodiments, propulsion system 124 may be configured primarily to provide thrust while other structures of mobile platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of mobile platform 110 and/or system 100.

In some embodiments, other modules 126 may include one or more actuated and/or articulated devices (e.g., multispectrum active illuminators, visible and/or IR cameras, radars, sonars, and/or other actuated devices) coupled to mobile platform 110, where each actuated device includes one or more actuators adapted to adjust an orientation of the device, relative to mobile platform 110, in response to one or more control signals (e.g., provided by controller 112). In particular, other modules 126 may include a stereo vision system configured to provide image data that may be used to calculate or estimate a position of mobile platform 110, for example, or to calculate or estimate a relative position of a navigational hazard in proximity to mobile platform 110. In various embodiments, controller 112 may be configured to use such proximity and/or position information to help safely pilot mobile platform 110 and/or monitor communication link quality, as described herein.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of mobile platform 110 and/or other elements of system 100. For example, user interface 132 may be adapted to display a time series of positions, headings, and/or orientations of mobile platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause mobile platform 110 to move according to the target heading, route, and/or orientation, or to aim sensor payload 140 accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., sensor payload 140) associated with mobile platform 110, for example, and to generate control signals for adjusting an orientation and/or position of the actuated device according to the target altitude, orientation, and/or position. Such control signals may be transmitted to controller 112 (e.g., using communications modules 134 and 120), which may then control mobile platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or mobile platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of mobile platform 110 and/or system 100 or to process sensor data to compensate for environmental conditions, such as an water content in the atmosphere approximately at the same altitude and/or within the same area as mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. As another example, communications module 144 may be configured to transmit measurement ranges from SER 145 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor and communicate the status of an orientation of the sensor payload 140 as described herein. Such status information may be provided or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity, Magnetic North, and/or an orientation of mobile platform 110) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of mobile platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for mobile platform 110, using one or more power leads. Such power leads may also be used to support one or more communication techniques between elements of system 100.

Figure 2:
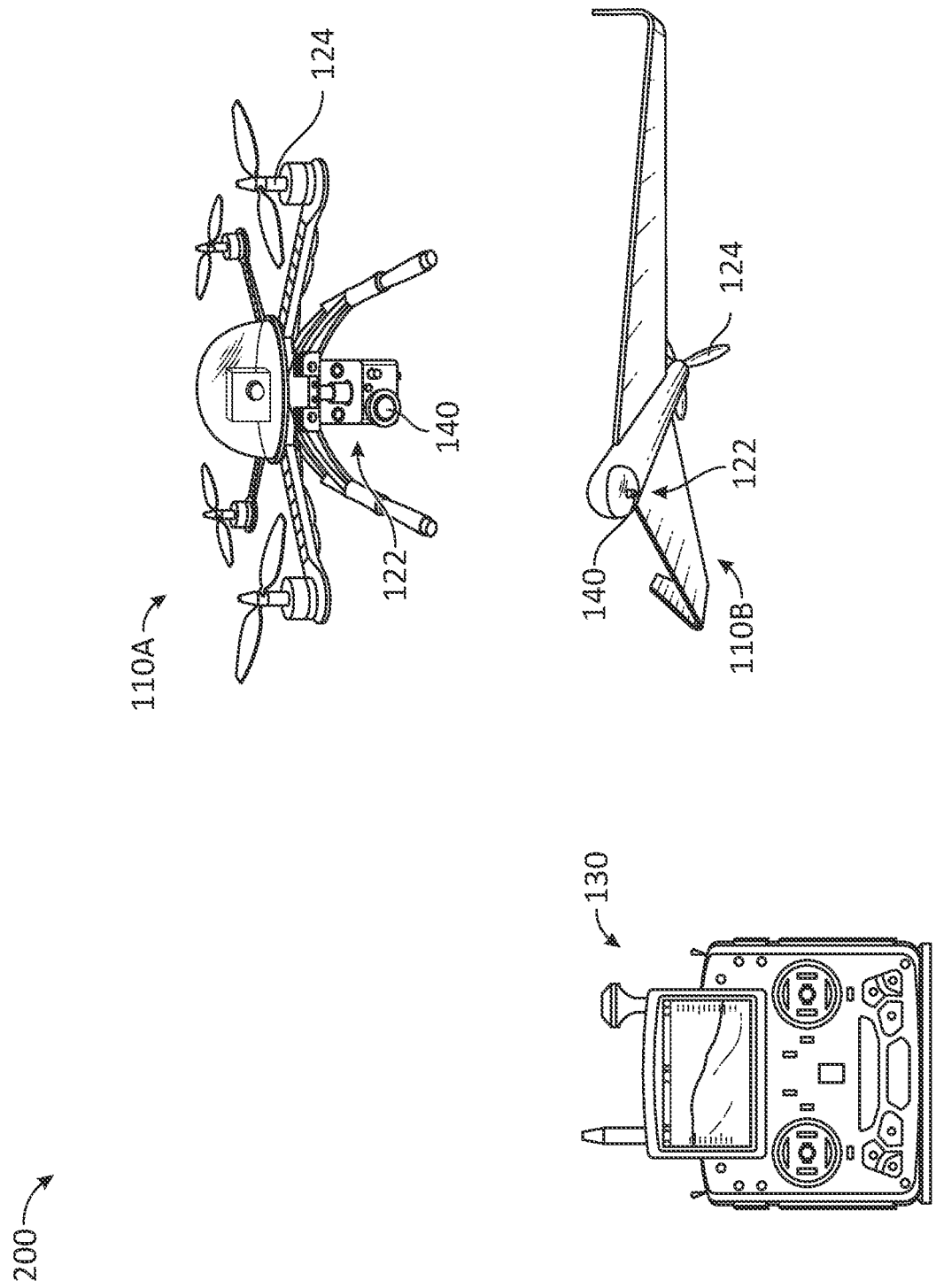
FIG. 2 illustrates a diagram of a survey system including mobile platforms in accordance with an embodiment of the disclosure.

FIG. 2 illustrates a diagram of survey system 200 including mobile platforms 110A and 110B, each with sensor payloads 140 and associated gimbal systems 122 in accordance with an embodiment of the disclosure. In the embodiment shown in FIG. 2, survey system 200 includes base station 130, mobile platform 110A with articulated imaging system/sensor payload 140 and gimbal system 122, and mobile platform 110B with articulated imaging system/sensor payload 140 and gimbal system 122, where base station 130 may be configured to control motion, position, and/or orientation of mobile platform 110A, mobile platform 110B, and/or sensor payloads 140. More generally, survey system 200 may include any number of mobile platforms 110, 110A, and/or 110B.

Figure 3A:
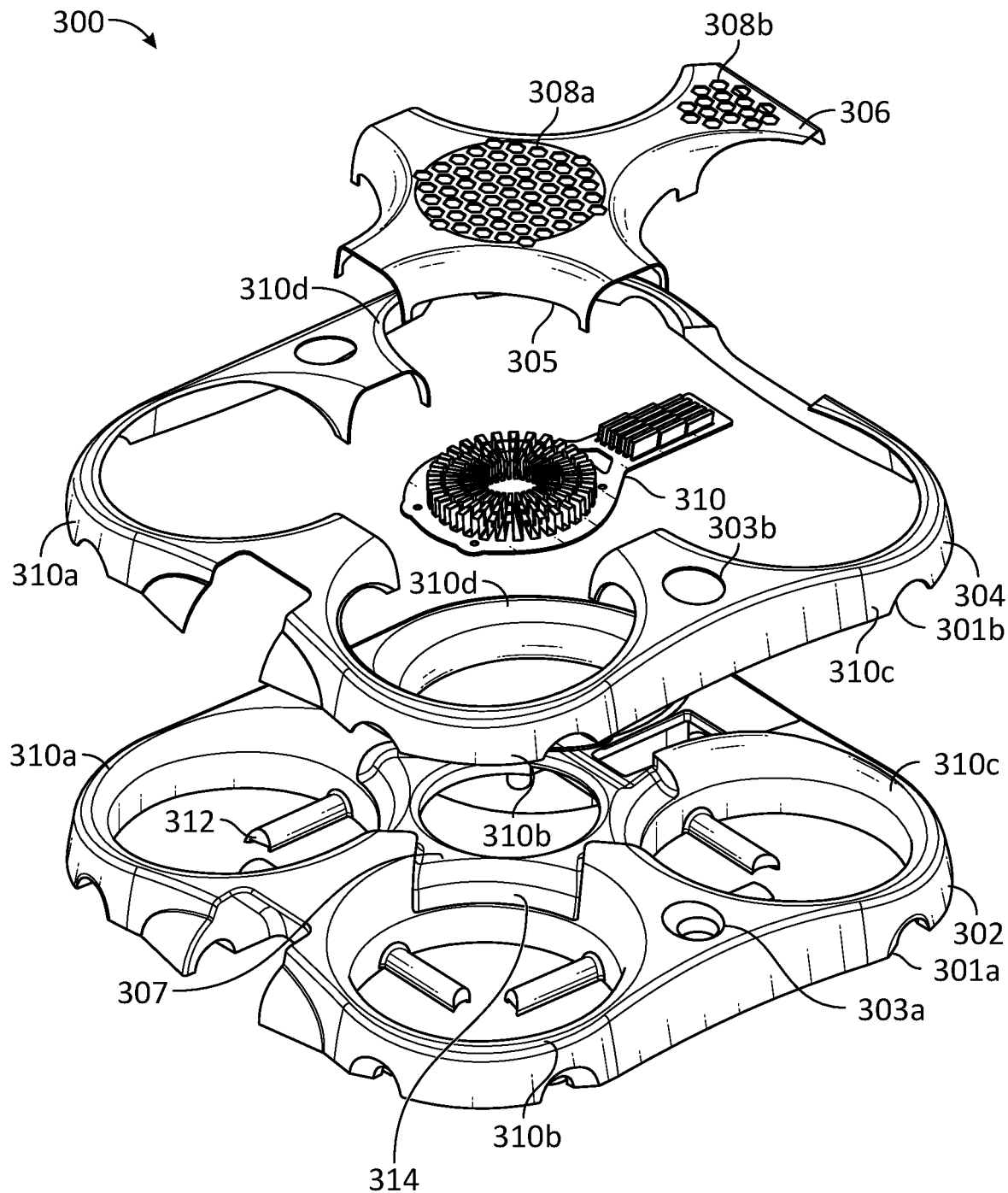
FIG. 3A illustrates a top perspective exploded view of a top airframe assembly for a UAV in accordance with an embodiment of the disclosure.

FIG. 3A illustrates a top perspective exploded view of a top airframe assembly 300 for a UAV in accordance with an embodiment of the disclosure. For example, the UAV may be, may be part of, or may include mobile platform 110 of FIG. 1. Top airframe assembly 300 may include a top airframe core 302 and a top airframe shell 304. Top airframe shell 304 may be formed using a polycarbonate material or other relatively rigid material and may be approximately 0.3 mm to 0.5 mm thick in some embodiments. Top airframe shell 304 may include a secondary cover 306 comprising cooling air inlet orifices (e.g., orifices 308a and 308b). In some cases, secondary cover 306 may be part of a single body of top airframe shell 304 or in some cases may be removably connected to top airframe shell 304. The cooling air inlet orifices may be disposed in a location about top airframe shell 304 and/or secondary cover 306 to facilitate air flow to heat sink 310 through airflow channels as discussed herein.

Heat sink 310 may be disposed at least partially between top airframe core 302 and top airframe shell 304 in some embodiments. Heat sink 310 may be a metal heat sink assembly configured to cool power electronics, other electronic elements, and other internal hardware of the UAV. For example, ambient air may flow through the air inlet orifices of top airframe shell 304 to reach dissipation surfaces of heat sink 310 as further discussed below. Heat sink 310 may be thermally coupled to the power electronics or other internal hardware such that heat sink 310 may dissipate heat away from the power electronics or the internal hardware via conduction. In some instances, heat sink 310 may include folded fins to provide a larger surface area to disperse heat away from the power electronics and other internal hardware of the UAV.

Top airframe core 302 may be partially enclosed within top airframe shell 304 in an assembly (e.g., overmolding process) of top airframe assembly 300. In some embodiments, top airframe core 302 may be formed using an expanded polystyrene (EPS) foam having an approximate density of 20 to 30 kg/m$^3$. Top airframe core 302 and top airframe shell 304 may be assembled to form inlets 310a-310d of rotor ducts disposed about UAV propulsion mounts.

Inlets 310a-310d of the rotor ducts may be assembled to diffusor outlets 410e-410h of rotor ducts as discussed below to form rotor ducts of the UAV. The rotor ducts may be configured to protect rotating rotors disposed within the UAV propulsion mounts from physical damage caused by impact with environmental flight hazards. Each rotor duct may be connected to an inlet and diffusor outlet shaped to increase thrust efficiency of a propulsion system for the UAV. For example, an overall thrust gain of greater than one may be provided by a density of the top and bottom airframe assemblies and a shape of the rotor ducts when normalized to a combined weight of the top and bottom airframe assemblies. Accordingly, any weight added to the UAV by forming the rotor ducts is offset by the thrust gain provided by the rotor ducts.

An airflow channel may be defined by an internal surface 305 of top airframe shell 304 (e.g., or secondary cover 306 of airframe shell 304) and internal surface 307 of top airframe core 302 when top airframe shell 304 and top airframe core 302 are connected. The airflow channel may extend from the air inlet orifices to the air outflow 314 disposed within an inner wall of inlet 310b of a rotor duct. Air outflow 314 may be defined by a notch of secondary cover 306 and groove defined in top airframe core 302. Each airflow channel defined the top airframe shell 304 and top airframe core 302 may be configured to form an air conduit between the plurality of cooling air inlet orifices and a negative pressure above a rotor plane defined by a rotor rotating in a corresponding rotor duct. The rotor rotating in the corresponding rotor duct may draw ambient air from the plurality of cooling air inlet orifices to a dissipation surface of heat sink 310, into the corresponding rotor duct through air outflow 314, and out of a diffusor outlet of the corresponding rotor duct. As such, airflow may be optimized to enhance flight time characteristics of the UAV.

FIG. 3A shows top propulsion mount supports, one of which is labeled top propulsion mount support 312. Top propulsion mount support 312 may extend from an inner surface of inlet 310a (e.g., inner surface of top airframe core 302) to a central region within inlet 310a. Top propulsion mount support 312 may provide structural support and protection for a propulsion system of the UAV including, e.g., electric motor, rotor, rotor shaft, rotor blades, etc. The description of top propulsion mount support 312 may generally be applied to the additional propulsion mounts shown in FIG. 3A.

In some embodiments, top airframe shell 304 and top airframe core 302 may provide housing for various sensors, imagers, and/or other devices of the UAV. For example, top airframe shell 304 may include housing elements 301b and 303b. Housing elements 301b and 303b of top airframe shell may complement housing elements 301a and 303a of top airframe core 302 to provide a top portion of housing for the sensors/imagers/devices of the UAV. A bottom portion of the housing may be formed from a bottom airframe assembly as discussed below in reference to FIG. 4. In various embodiments, the sensors/imagers/devices may include one or more sensors, imagers, or devices discussed in reference to FIGS. 1 and 2. Such sensors, imagers, and other devices may be placed around the airframe assembly to provide for 360-degree awareness. For example, ultrasound sensors may be used to determine where the UAV is located relative to its surroundings.

Figure 3B:
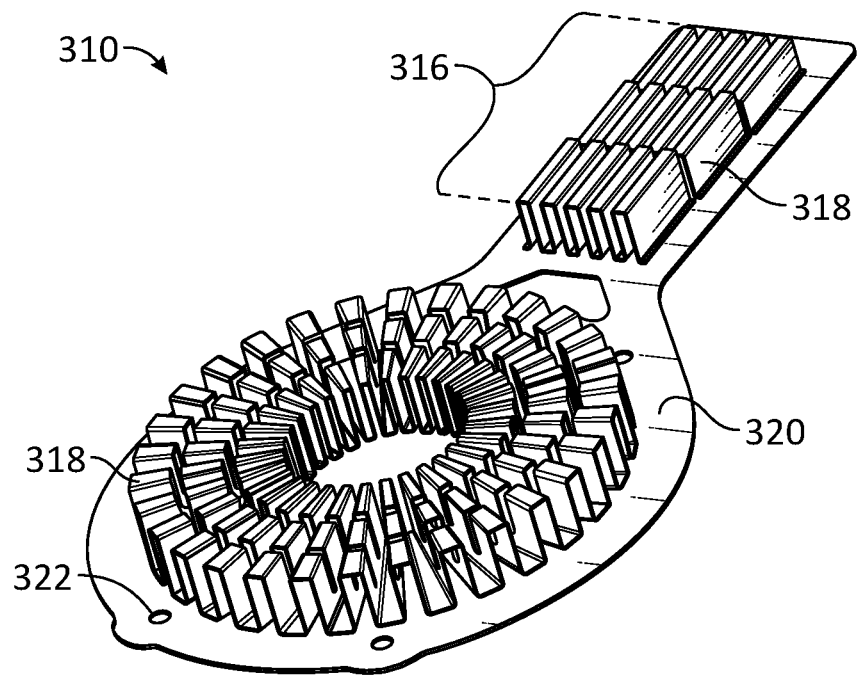
FIGS. 3B and 3C illustrate perspective view of a heat sink of the top airframe assembly of FIG. 3A in accordance with an embodiment of the disclosure.
Figure 3C:
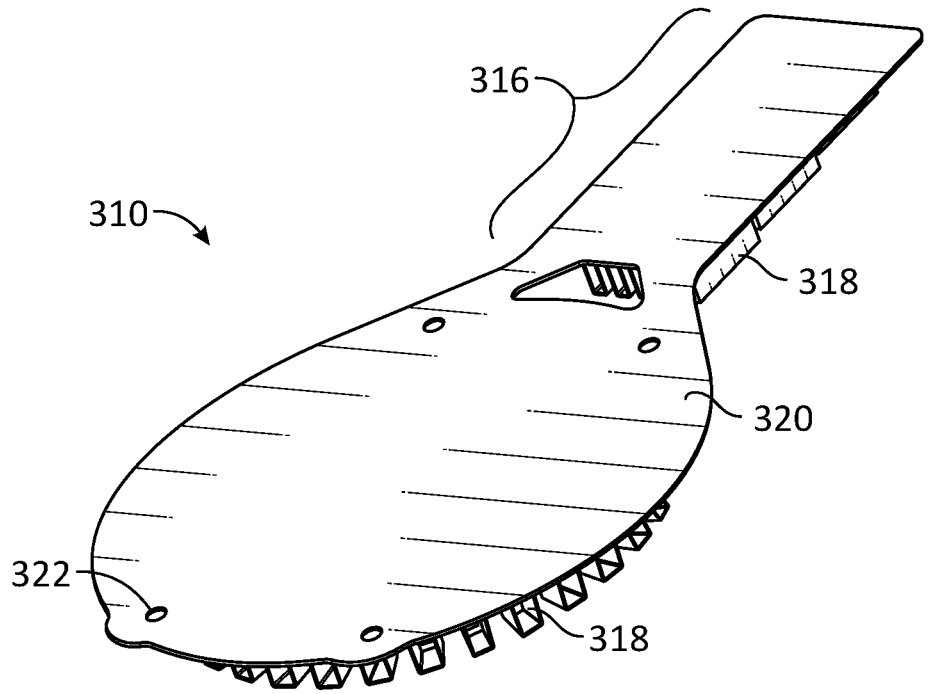

FIG. 3B illustrates a top perspective view of heat sink 310 of FIG. 3A in accordance with one or more embodiments of the disclosure. FIG. 3C illustrates a bottom perspective view of heat sink 310 of FIG. 3B. Heat sink 310 may be a folded fin heat sink having folded fins 318 disposed on a central portion 320 of heat sink 310. In some embodiments, heat sink 310 may include a secondary portion 316 (e.g., a leg portion) that extends from central portion 320 as shown in FIGS. 3B and 3C. Secondary portion 316 may extend from central portion 320 between adjacent rotors to dissipate heat from additional power electronics, electronic elements, or other internal hardware within a UAV that is different than the power electronics are hardware corresponding to central portion 320. Although only one portion (secondary portion 316) is shown as extending from central portion 320, additional configurations having more or fewer extending portions (e.g., leg portions) may be implemented to provide cooling to different and/or physically separate hardware within the UAV as needed. Such additional extending portions may be disposed between rotor ducts of the UAV and serve to thermally cool various power electronics, different electronic elements, and internal hardware disposed within the airframe assembly of the UAV. In an aspect, secondary portion 316 may include folded fins 318 to increase heat dissipation performance.

Although secondary portion 316 is shown as substantially rectangular, secondary portion 316 may be shaped as needed to complement a shape of hardware within the UAV that requires cooling. Heat sink 310 may include through-holes (one of which is through-hole 322) to facilitate securing heat sink to top airframe core 302. In this regard, heat sink 310 may be overmolded during molding of top airframe core 302 to reduce part count, weight, and assembly fixturing/issues. Thus, through-holes of heat sink 310 may be used in the overmolding process to secure heat sink 310 to the top airframe core 302 to form a composite component of the UAV. In one or more embodiments, heat sink 310 may be made of an aluminum or copper material.

Figure 4:
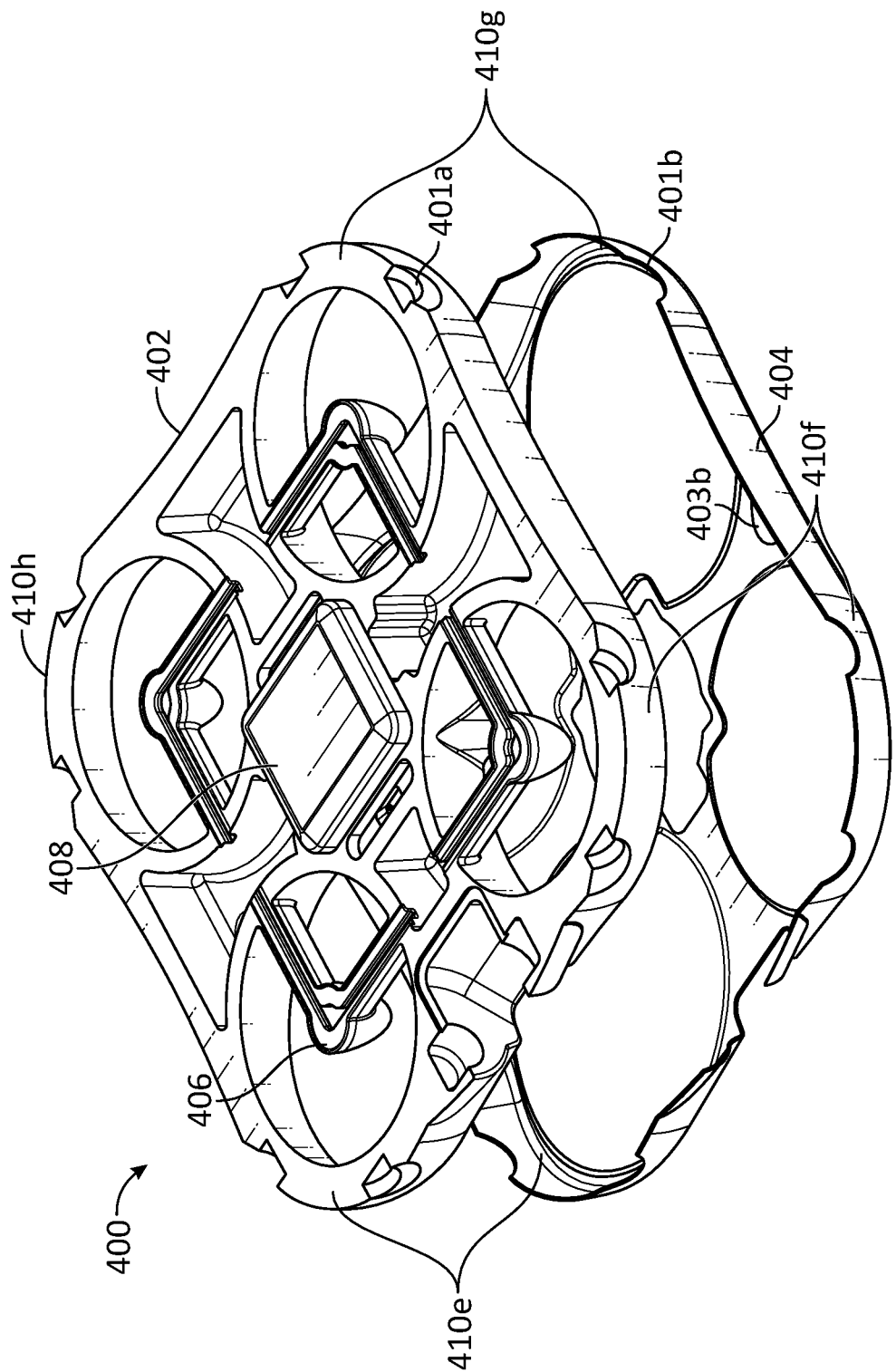
FIG. 4 illustrates a top perspective exploded view of a bottom airframe assembly for a UAV in accordance with an embodiment of the disclosure.

FIG. 4 illustrates a top perspective exploded view of a bottom airframe assembly 400 for a UAV in accordance with an embodiment of the disclosure. For example, the UAV may be, may be part of, or may include mobile platform 110 of FIG. 1. Bottom airframe assembly 400 may include a bottom airframe core 402 and a bottom airframe shell 404. Bottom airframe shell 404 may be a vacuum formed polycarbonate material approximately 0.3 mm to 0.5 mm thick according to some embodiments.

Bottom airframe core 402 may be partially enclosed within bottom airframe shell 404 in an assembly (e.g., overmolding process) of bottom airframe assembly 400. In some embodiments, bottom airframe core 402 may be formed from foam material comparable to that of top airframe core 302 of FIG. 3A (e.g., an expanded polystyrene (EPS) foam having an approximate density of 20 to 30 kg/m$^3$). Bottom airframe core 402 and bottom airframe shell 404 may be assembled to form diffusor outlets 410e-410h of rotor ducts disposed about UAV propulsion mounts. It is noted that part of diffusor outlet 410h made from bottom airframe shell 404 is not shown in FIG. 4. Diffusor outlets 410e-410h of the rotor ducts may align with inlets 310a-310d of the rotor ducts shown in FIG. 3A to form the rotor ducts of the UAV.

In the embodiment shown in FIG. 4, bottom propulsion mount supports (one of which is propulsion mount support 406) of the UAV propulsion mounts extend from two locations of an inner surface of bottom airframe core 402 to a central region within diffusor outlets 410e-410h of the rotor ducts. Bottom propulsion mount supports shown in FIG. 4 may complement top propulsion mount supports shown in FIG. 3A to provide structural support for a propulsion system of the UAV. The description of bottom propulsion mount support 406 may generally be applied to the additional bottom propulsion mount supports shown in FIG. 4.

In some embodiments, bottom airframe shell 404 and bottom airframe core 402 may provide bottom portions of housing for various sensors, imagers, or other devices of the UAV to complement the top portions housing discussed above in reference to FIG. 3A. For example, bottom airframe shell 404 may include housing element 401b and bottom airframe core may include housing element 403b where housing elements 401a and 40b may form a bottom portion of housing that may be complemented by housing elements 301a and 301b that form the top portion of the housing. Thus, when top airframe assembly 300 and bottom airframe assembly 400 are connected to form the airframe assembly, their respective housing elements may complement each other to provide for complete housing for sensors, imagers, and other devices of the UAV.

Bottom airframe core 402 may include a mounting pad 408 disposed within an inner region of a support frame that may be placed on bottom propulsion mount supports of bottom airframe fore 402. Power electronics, electronic elements, and other internal hardware may be mounted on mounting pad 408 (e.g., using adhesive or overmolded). For example, internal electronics such as controller 112 and communications module 120 discussed in reference to FIG. 1 may be mounted to mounting pad 408 in an embodiment.

Figure 5:
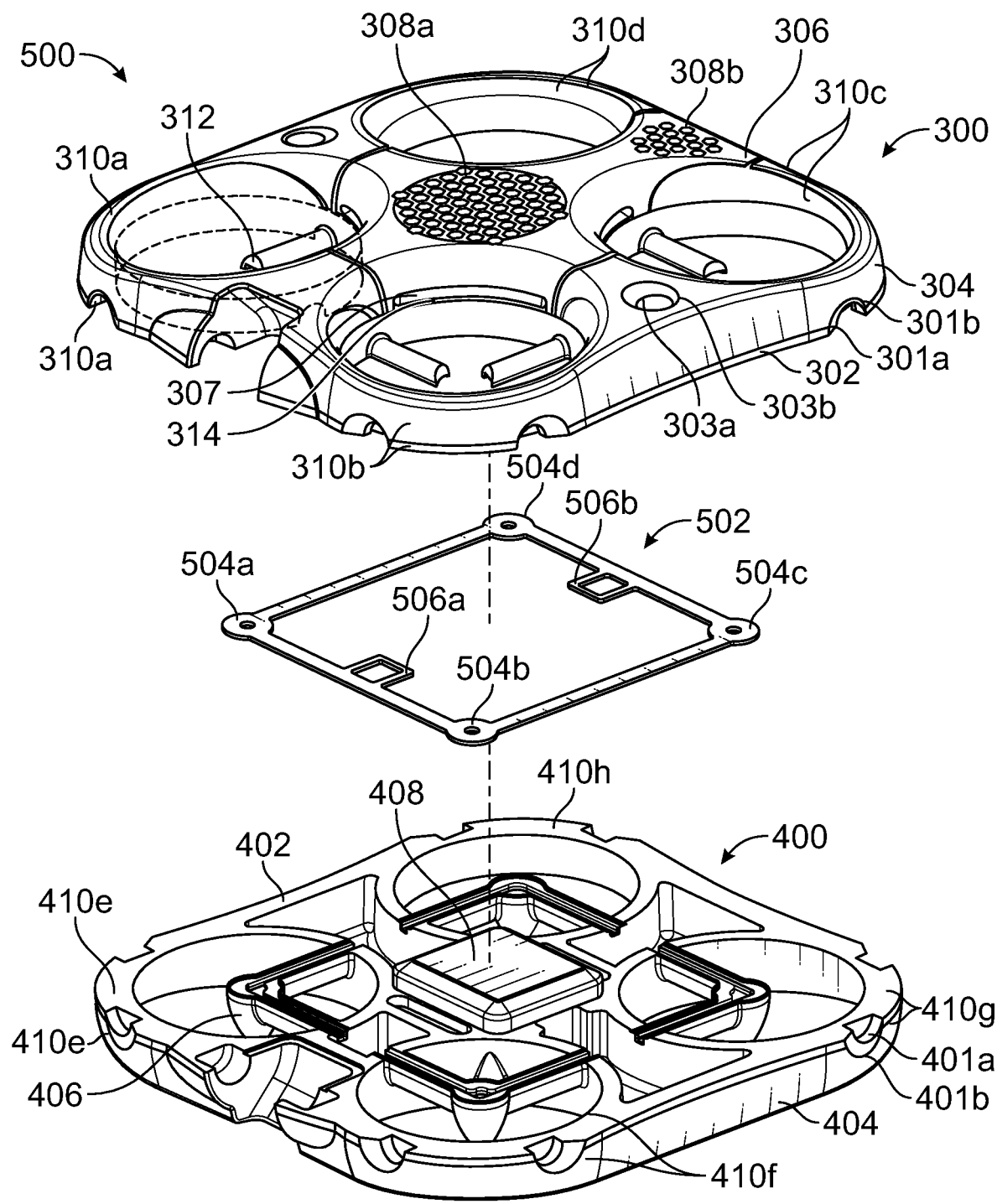
FIG. 5 illustrates a perspective exploded view of an airframe assembly for a UAV in accordance with an embodiment of the disclosure.

FIG. 5 illustrates a perspective exploded view of an airframe assembly 500 for a UAV in accordance with an embodiment of the disclosure. The UAV may be, may be part of, or may include mobile platform 110 of FIG. 1 according to various embodiments. Airframe assembly 500 may include top airframe assembly 300 assembled to bottom airframe assembly 400 where mounting frame 502 is enclosed within top airframe assembly 300 and bottom airframe assembly 400. In some embodiments, an adhesive may be used to couple top airframe assembly 300 to bottom airframe assembly 400. Similarly, an adhesive may be used to couple mounting frame 502 to top airframe assembly 300 and/or bottom airframe assembly 400. In an implementation, mounting frame 502 may be configured to physically couple top airframe core 302 to bottom airframe core 402. In this regard, mounting frame 502 may be disposed at least partially between the top propulsion mount supports of top airframe assembly 300 and the bottom propulsion mount supports of bottom airframe assembly 400.

Mounting frame 502 may be utilized as a support frame for the UAV as well as a mechanical linkage between the airframe assembly 500 and corresponding UAV propulsion motors. In this regard, each mount 504a-504d of mounting frame 502 may correspond to a propulsion motor mount. Mounting frame 502 may include bar stabilizers 506a and 506b to provide stability to the UAV during a flight time. In some embodiments, mounting frame 502 may be a carbon fiber frame to provide lightweight yet rigid structural support for the UAV. Mounting frame 502 may be approximately 2 mm thick in some implementations. Although mounting frame 502 is shown to be substantially polygonal in shape, mounting frame 502 may be various different planar shapes are contemplated to provide structural support for the UAV and its propulsion motor mounts.

Figure 6A:
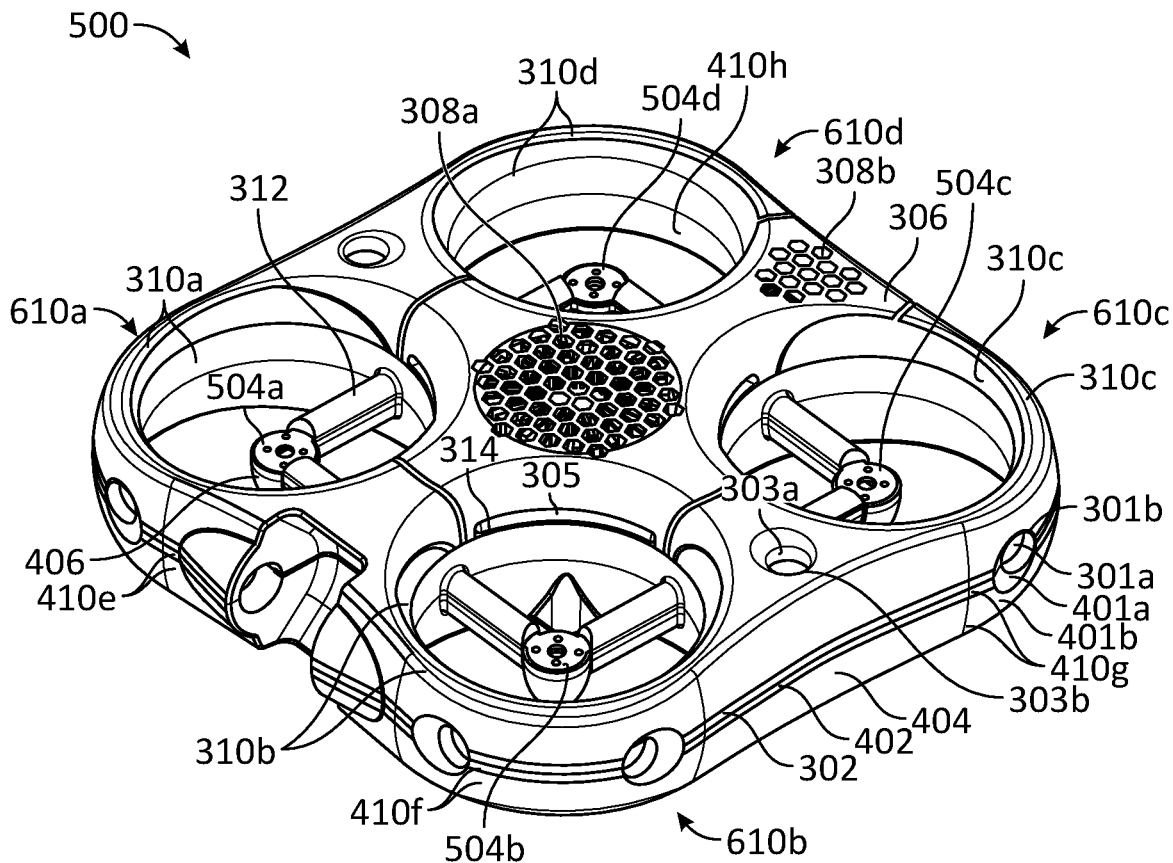
FIG. 6A illustrates a perspective view of the assembled airframe assembly of FIG. 5 in accordance with an embodiment of the disclosure

FIG. 6A illustrates a perspective view of airframe assembly 500 for the UAV in accordance with an embodiment of the disclosure. As shown in FIG. 6A, mounting frame 502 may be partially enclosed between top airframe assembly 300 and bottom airframe assembly 400 such that mounts 504a-504d of mounting frame 502 are exposed to allow a rotor shaft (or other rotor assembly component) to be inserted through each of mounts 504a-504d and received by bottom propulsion mount supports of bottom airframe assembly 400. As shown in FIG. 6A, inlets 310a-310d and diffusor outlets 410e-410h may be complementarily assembled for form rotors 610a-610d, respectively.

Figure 6B:
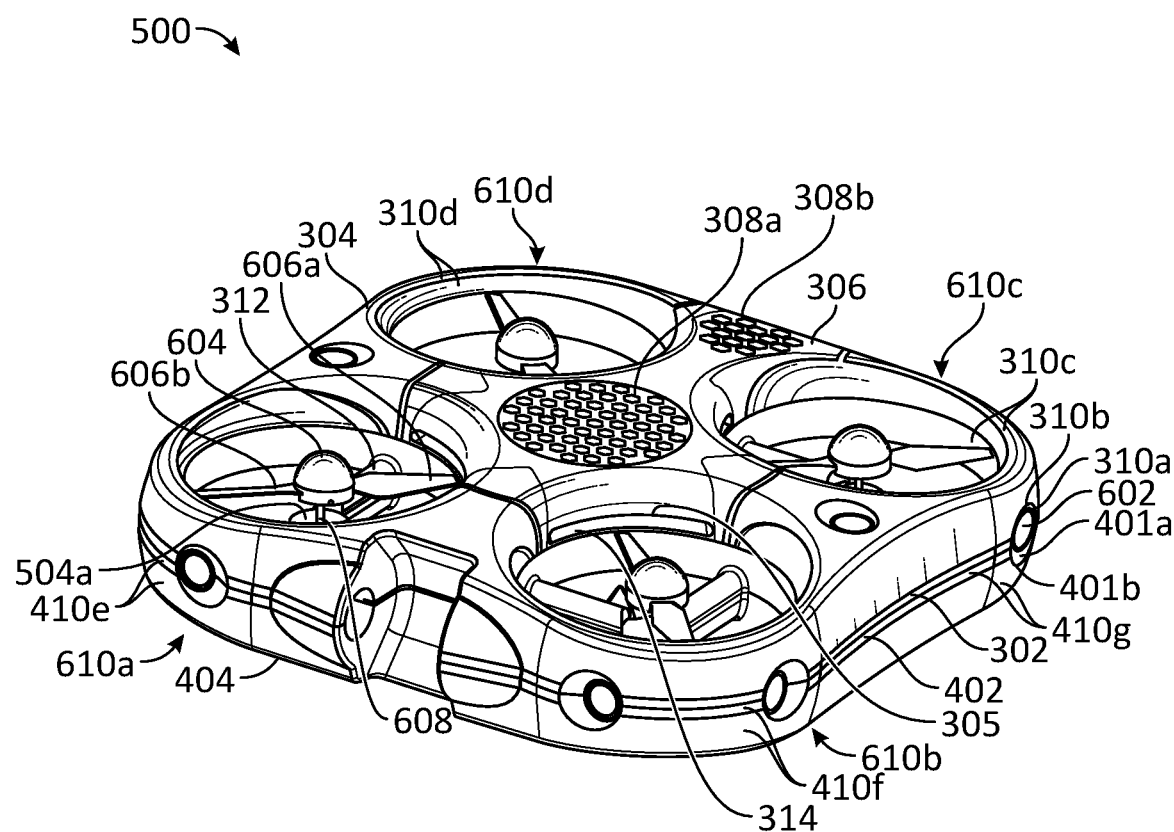
FIG. 6B illustrates a perspective view of the assembled airframe assembly of FIG. 6B in which rotor assemblies are disposed within rotor ducts of the assembled airframe assembly in accordance with an embodiment of the disclosure.

FIG. 6B illustrates a perspective view of airframe assembly 500 of FIG. 6A in which rotor assemblies are disposed within rotor ducts 610a-610d of airframe assembly 500 in accordance with an embodiment of the disclosure. One rotor assembly of the rotor assemblies is labeled as rotor assembly 604 having rotor blades 606a and 606b and rotor shaft 608 inserted through mounts 504a of a mounting frame and received in bottom propulsion mount support 406 (not shown in FIG. 6B) of bottom airframe assembly 402. In one or more embodiments, airframe assembly 500 may have overall dimensions of approximately 350 mm by 350 mm by 90 mm.

Figure 7:
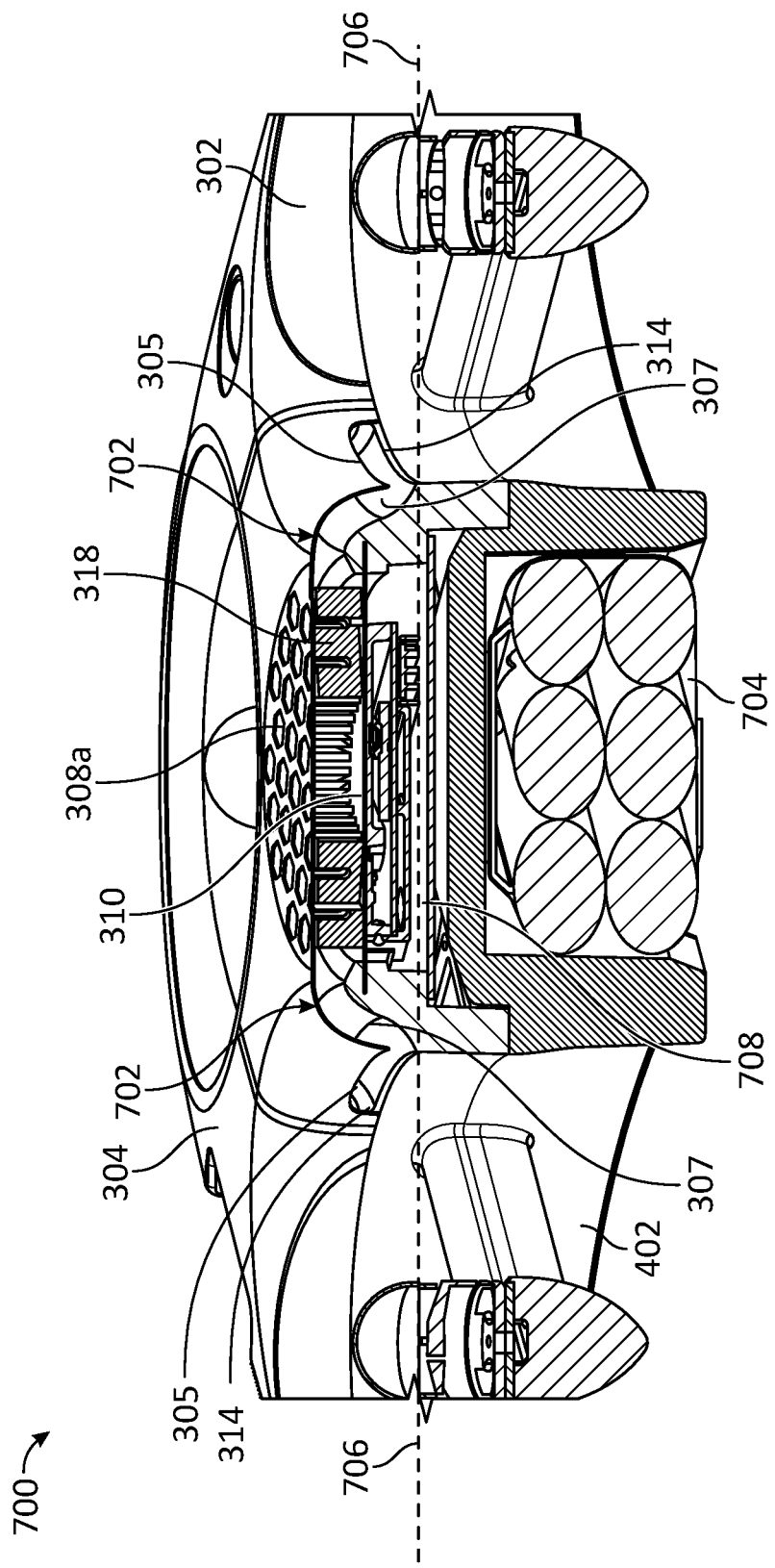
FIG. 7 illustrates a cross-sectional view of an airframe assembly that has an airflow channel in accordance with one or more embodiments of the disclosure.

FIG. 7 illustrates a cross-sectional view of an airframe assembly 500 that has an airflow channel 702 in accordance with one or more embodiments of the disclosure. Airflow channel 702 may be formed between top airframe shell 304 and top airframe core 302. Each rotor duct may have an airflow outlet 314 disposed in an inner wall of the rotor duct above a rotor blade plane 706. Airflow outlet 314 may be formed by an internal surface 305 of top airframe shell 304 and an internal surface 307 of top airframe core 302 when top airframe shell 304 and top airframe core 302 are connected. Each airflow channel corresponding to the rotor ducts of the UAV may be configured to form an air conduit between the plurality of cooling air inlet orifices (one of which is orifice 308a) and a negative pressure generated by a rotor rotating rotor blades in a corresponding rotor duct such that ambient air is drawn through the plurality of cooling air inlet orifices to a dissipation surface of heat sink 310, into at least one of the rotor ducts via the airflow outlet 314 disposed in the rotor duct, and through the diffusor outlet of the corresponding rotor duct.

In various embodiments, power electronics/electronic elements 708 may be disposed on a mounting pad of bottom airframe core 402 and thermally coupled to heat sink 310 such that power electronics 708 may be cooled via the conduction characteristics of heat sink 310 such as the surface area of heat sink 310 that receives cool air through one or more airflow channels of the UAV as discussed above. Power electronics 708 may include one or more electronic devices discussed with reference to FIGS. 1 and 2 according to various embodiments. Airframe assembly 708 may include a portable power supply 704 disposed between bottom airframe core 402 and a bottom airframe shell (not shown in FIG. 7). In some embodiments, portable power supply may be one or more batteries used to supply power to power electronics 708 in some cases.

FIG. 8 illustrates a flow diagram of a process 800 for assembling an airframe assembly for a UAV in accordance with an embodiment of the disclosure. The airframe assembly may be, may be part of, or may include airframe assembly 500 as discussed herein. It should be appreciated that any step, sub-step, sub-process, or block of process 800 may be performed in an order or arrangement different from the embodiments illustrated by FIG. 8. For example, in some embodiments, one or more blocks may be omitted from or added to process 800.

At block 802, a top airframe shell may be overmolded with a foam where the foam forms a top airframe core that is at least partially enclosed within the top airframe shell. The foam may be expanded polystyrene (EPS) foam having an approximate density of 20 to 30 kg/m$^3$ according to some embodiments. The top airframe shell may be vacuum formed from polycarbonate and may be approximately between 0.3 to 0.5 mm thick, but may be thinner or thicker, uniformly or non-uniformly, to suit a particular application. In some embodiments, a heat sink may be overmolded into the top airframe core to, for example, reduce part count, weight, and assembly fixturing and issues. The heat sink may be overmolded such that a first side of the heat sink faces a bottom foam airframe core and a second side of the heat sink having folded fins faces an inner surface of the top airframe shell. A top airframe assembly may comprise the top airframe shell, the top airframe core, and the heatsink.

At block 804, a bottom airframe shell may be overmolded with a foam where the foam forms a bottom airframe core that is at least partially enclosed within the bottom airframe shell. The foam may be comparable to the foam used to form the top airframe core (e.g., expanded polystyrene (EPS) foam having an approximate density of 20 to 30 kg/m$^3$). Similar to the top airframe shell, the bottom airframe shell may be a vacuum formed polycarbonate shell approximately between 0.3 to 0.5 mm thick but may be thinner or thicker, uniformly or non-uniformly, to suit a particular application.

In some embodiments, power electronics/electronic elements may be attached to a mounting pad of the bottom airframe shell such that the power electronics are disposed between the bottom airframe core and the top airframe core. The power electronics may be thermally attached to the first side of the heat sink such that heat may be dissipated away from the power electronics via conduction of the heat sink and an airflow that flows along heat dissipation surfaces of fold fins of the heat sink.

A bottom airframe assembly may comprise the bottom airframe shell and the bottom airframe core. As such, the top airframe assembly and the bottom airframe assembly may be durable foam-polycarbonate composite components. The polycarbonate airframe shells may be relatively rigid to protect against mechanical intrusions and abrasions during flight operation of the UAV. The foam airframe cores may consume impact energy from rough landings and crashes that the UAV may experience. Furthermore, the foam airframe cores provide vibration dampening for internal components of the UAV during flight operation.

At block 806, the top airframe assembly is attached to the bottom airframe assembly with a support frame (e.g., carbon fiber frame) enclosed, at least partially, between the top airframe assembly and the bottom airframe assembly. In an implementation, each side of the support frame may be supplied with adhesive such as double-sided adhesive tape to adhere the support frame to the bottom airframe core and the top airframe core. In some implementations, the top airframe core and/or the bottom airframe core may be supplied with adhesive to adhere to the support frame as the top airframe assembly, support frame, and bottom airframe assembly are assembled to create the airframe assembly of the UAV. In some embodiments, the adhesive supplied to the mounting frame, top airframe assembly, and/or bottom airframe assembly may act as a barrier for internal components of the UAV. For example, the adhesive may be applied such that a water-resistant barrier is formed to protect internal components such as the power electronics when the UAV has landed on/in a water surface.

Techniques discussed in the present disclosure substantially improve the operational flexibility and reliability of unmanned sensor platforms. For example, the present disclosure provides a low cost, low part count UAV architecture that lends itself to UAV safety and durability in constrained areas during flight time. The UAV architecture improves propulsion efficiency by employing low density materials and forming rotor ducts shaped to provide an overall thrust gain for the UAV. Furthermore, the UAV architecture allows for upside-down landing and take-off because the rotors are protected from impact with the ground in either orientation by the rotor ducts. In various embodiments, the UAV architecture may be sufficiently buoyant that the UAV floats in water. In some embodiments, the buoyancy may be sufficient to keep the UAV's rotors from being submerged, regardless of the orientation of the UAV relative to the water surface. In other embodiments, the UAV's rotors may be partially or completely submerged, and the UAV may be configured to operate the rotors under water and provide sufficient thrust to escape the water surface and lift the UAV into the air. In addition, while FIGS. 3A-7 describe UAVs with four ducts, it should be understood that similar ducting, airframe assembly features, and/or cooling strategies may be used to form UAVs with a variety of different numbers of ducts and/or rotors, including embodiments with a single duct and multiple, counterrotating rotors, for example, and embodiments with two, three, six, or eight or more ducts and one or multiple rotors disposed within each duct.

Where applicable, various embodiments provided by the present disclosure can be implemented using hardware, software, or combinations of hardware and software. Also, where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An airframe assembly for an unmanned aerial vehicle (UAV), the airframe assembly comprising:
a top airframe assembly comprising a top foam airframe core at least partially enclosed within a top airframe shell; and
a bottom airframe assembly comprising a bottom foam airframe core at least partially enclosed within a bottom airframe shell and coupled to the top airframe assembly, wherein:
the top and bottom foam airframe cores form one or more rotor ducts;
each rotor duct comprises an inlet and a diffusor outlet shaped to increase a thrust efficiency of a propulsion system for the UAV;
the top airframe assembly comprises a metal heat sink assembly disposed at least partially between the top foam airframe core and the top airframe shell and configured to cool at least power electronics of the UAV; and
the top airframe shell comprises a plurality of cooling air inlet orifices configured to allow ambient air to reach a dissipation surface of the metal heat sink assembly.

2. The airframe assembly of claim 1, further comprising: a planar support frame disposed between the top and bottom foam airframe cores and configured to physically couple the top foam airframe core to the bottom foam airframe core, wherein:
the planar support frame comprises one or more UAV propulsion motor mounts each configured to provide a mechanical linkage between the airframe assembly and a corresponding UAV propulsion motor;
the one or more rotor ducts are disposed about the one or more UAV propulsion motor mounts, respectively; and
the one or more rotor ducts are configured to protect rotating rotors disposed therein from physical damage caused by impact with environmental flight hazards.

3. The airframe assembly of claim 1, wherein:
the one or more rotor ducts are a plurality of rotor ducts;
the top airframe shell is more rigid than the top foam airframe core;
the bottom airframe shell is more rigid than the bottom foam airframe core;
the top and bottom airframe shells are configured to protect against mechanical intrusions and abrasions during flight operation of the UAV;
the top and bottom foam airframe cores are configured to consume impact energy and provide vibration dampening for internal components of the UAV;

each rotor duct inlet is formed, at least in part, by the top foam airframe core; and each rotor duct diffusor outlet is formed, at least in part, by the bottom foam airframe core.

4. The airframe assembly of claim 1, wherein the top and bottom foam airframe cores are configured to render the airframe assembly sufficiently buoyant while the UAV is floating on a water surface to position rotors disposed within the one or more rotor ducts substantially above the water surface.

5. The airframe assembly of claim 1, wherein:
the airframe assembly comprises at least one airflow channel formed between the top airframe shell and the top foam airframe core;
each airflow channel is configured to form an air conduit between the plurality of cooling air inlet orifices and a negative pressure above a rotor plane generated by a rotor rotating in a corresponding one of the one or more rotor ducts; and
the rotor rotating in the corresponding rotor duct draws the ambient air from the plurality of cooling air inlet orifices to the dissipation surface of the metal heat sink assembly, into the corresponding rotor duct, and out of the diffusor outlet of the corresponding rotor duct.

6. The airframe assembly of claim 1, wherein:
a density of the top and bottom foam airframe cores and a shape of the rotor ducts are configured to provide an overall thrust gain for the UAV;
the overall thrust gain is normalized to at least a combined weight of the top and bottom foam airframe cores; and
the overall thrust gain is greater than one.

7. The airframe assembly of claim 1, wherein:
the top airframe shell comprises a secondary cover disposed over the metal heat sink assembly disposed at least partially between the top foam airframe core and the secondary cover and configured to cool at least the power electronics of the UAV; and
the secondary cover comprises the plurality of cooling air inlet orifices configured to allow ambient air to reach the dissipation surface of the metal heat sink assembly.

8. The airframe assembly of claim 7, wherein:
the airframe assembly comprises at least one airflow channel formed between the top airframe shell and the top foam airframe core;
each airflow channel is configured to form an air conduit between the plurality of cooling air inlet orifices and a negative pressure above a rotor plane defined by a rotor rotating in a corresponding one of the one or more rotor ducts; and
the rotor rotating in the corresponding rotor duct draws the ambient air from the plurality of cooling air inlet orifices to the dissipation surface of the metal heat sink assembly, into the corresponding rotor duct, and out of the diffusor outlet of the corresponding rotor duct.

9. The airframe assembly of claim 1, wherein the top and/or bottom foam airframe cores comprise expanded polystyrene foam and/or polycarbonate.

10. A method for assembling the airframe assembly of claim 1, the method comprising:
overmolding the top airframe shell with the top foam airframe core to form the top airframe assembly;
overmolding the bottom airframe shell with the bottom foam airframe core to form the bottom airframe assembly;
attaching the top airframe assembly to the bottom airframe assembly; and overmolding the metal heat sink assembly with the top foam airframe core such that a first side of the metal heat sink assembly faces the bottom foam airframe core and a second side of the metal heat sink assembly faces an inner surface of the top airframe shell, wherein the second side of the metal heat sink assembly comprises the dissipation surface comprising a plurality of folded fins.

11. The method of claim 10, further comprising:
attaching the power electronics of the UAV to a mounting pad of the bottom foam airframe core such that the power electronics are disposed between the bottom foam airframe core and the top foam airframe core; and
thermally coupling the first side of the metal heat sink assembly to the power electronics of the UAV.

12. An airframe assembly for an unmanned aerial vehicle (UAV), the airframe assembly comprising:
a top airframe assembly comprising a top foam airframe core at least partially enclosed within a top airframe shell; and
a bottom airframe assembly comprising a bottom foam airframe core at least partially enclosed within a bottom airframe shell and coupled to the top airframe assembly, wherein:
the top and bottom foam airframe cores form one or more rotor ducts;
each rotor duct comprises an inlet and a diffusor outlet shaped to increase a thrust efficiency of a propulsion system for the UAV;
the top airframe assembly comprises a metal heat sink assembly overmolded by the top foam airframe core; and
the metal heat sink assembly is configured to cool at least power electronics of the UAV disposed between the bottom foam airframe core and the top foam airframe core.

13. The airframe assembly of claim 12, wherein:
the metal heat sink assembly comprises a central portion and a leg portion extending between two adjacent rotor ducts; and
the central portion of the metal heat sink assembly and the leg portion of the metal heat sink assembly are configured to cool different electronic elements of the UAV.

14. The airframe assembly of claim 12, wherein:
the metal heat sink assembly comprises a central portion and at least one leg portion; each leg portion extends between adjacent rotor ducts; and
the central portion of the metal heat sink assembly and each leg portion of the metal heat sink assembly are configured to cool different electronic elements of the UAV.

15. A method for assembling an airframe assembly for an unmanned aerial vehicle (UAV), the method comprising:
overmolding a top airframe shell with a top foam airframe core to form a top airframe assembly such that the top foam airframe core is at least partially enclosed within the top airframe shell;
overmolding a bottom airframe shell with a bottom foam airframe core to form a bottom airframe assembly such that the bottom foam airframe core is at least partially enclosed within the bottom airframe shell;
overmolding a metal heat sink assembly with the top foam airframe core such that a first side of the metal heat sink assembly faces the bottom foam airframe core and a second side of the metal heat sink assembly faces an inner surface of the top airframe shell, wherein the second side of the metal heat sink assembly comprises a dissipation surface comprising a plurality of folded fins; and attaching the top airframe assembly to the bottom airframe assembly, wherein:

the top and bottom foam airframe cores form one or more rotor ducts; and each rotor duct comprises an inlet and a diffusor outlet shaped to increase a thrust efficiency of a propulsion system for the UAV.

16. The method of claim 15, wherein:

the attaching the top airframe assembly to the bottom airframe assembly comprises physically coupling the top airframe assembly to the bottom airframe assembly using a planar support frame disposed between the top and bottom foam airframe cores;

the planar support frame comprises one or more UAV propulsion motor mounts each configured to provide a mechanical linkage between the airframe assembly and a corresponding UAV propulsion motor;

the one or more rotor ducts are disposed about the one or more UAV propulsion motor mounts, respectively; and the one or more rotor ducts are configured to protect rotating rotors disposed therein from physical damage caused by impact with environmental flight hazards.

17. The method of claim 15, further comprising:

attaching power electronics of the UAV to a mounting pad of the bottom foam airframe core such that the power electronics are disposed between the bottom foam airframe core and the top foam airframe core; and thermally coupling the first side of the metal heat sink assembly overmolded with the top foam airframe core to the power electronics of the UAV.

18. The method of claim 15, further comprising:

vacuum forming the top airframe shell and the bottom airframe shell from polycarbonate, wherein the top airframe assembly and the bottom airframe assembly form foam-polycarbonate composite components, wherein:

the one or more rotor ducts are a plurality of rotor ducts;

the top airframe shell is more rigid than the top foam airframe core;

the bottom airframe shell is more rigid than the bottom foam airframe core;

the top and bottom airframe shells are configured to protect against mechanical intrusions and abrasions during flight operation of the UAV; and the top and bottom foam airframe cores are configured to consume impact energy and provide vibration dampening for internal components of the UAV.

\* \* \* \* \*